(12) United States Patent
Ward et al.

(10) Patent No.: US 6,471,596 B2
(45) Date of Patent: Oct. 29, 2002

(54) THREAD TAPPING MACHINE

(75) Inventors: Michael E. Ward, Geneva, IL (US); Gary D. Porter, Lancaster, WI (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 09/876,699

(22) Filed: Jun. 7, 2001

(65) Prior Publication Data

US 2002/0032066 A1 Mar. 14, 2002

Related U.S. Application Data

(60) Provisional application No. 60/231,585, filed on Sep. 11, 2000.

(51) Int. Cl.[7] .............................................. B21D 53/24
(52) U.S. Cl. ............................ 470/87; 470/96; 470/98
(58) Field of Search ............................. 470/87, 96, 98, 470/102, 105, 165, 167; 408/207, 208, 209

(56) References Cited

U.S. PATENT DOCUMENTS

| | | | |
|---|---|---|---|
| 2,201,051 A | | 5/1940 | Ogilvie |
| 2,651,792 A | * | 9/1953 | Gibney .................... 470/96 |
| 2,834,972 A | * | 5/1958 | Morin ..................... 470/87 |
| 3,056,983 A | | 10/1962 | Devereux et al. |
| 3,510,896 A | * | 5/1970 | Von den Steinen ........... 470/96 |
| 3,561,544 A | | 2/1971 | Farmer |
| 3,668,726 A | | 6/1972 | Shinjo |
| 3,690,782 A | | 9/1972 | Petroff |
| 4,299,001 A | | 11/1981 | Cleary et al. |
| 4,438,539 A | | 3/1984 | Stephens |
| 4,457,153 A | | 7/1984 | Russell |
| 4,507,030 A | | 3/1985 | Jackson |
| 4,532,664 A | | 8/1985 | Steward et al. |
| 4,934,040 A | | 6/1990 | Turchan |
| 5,199,927 A | | 4/1993 | Rubin |
| 5,507,694 A | * | 4/1996 | Thun ........................ 470/98 |

* cited by examiner

*Primary Examiner*—Ed Tolan
(74) *Attorney, Agent, or Firm*—Welsh & Katz, Ltd.; Mark W. Croll; Paul F. Donovan

(57) ABSTRACT

A thread tapping machine for tapping female threads into a series of associated articles that are held in an associated stationary fixture includes a housing mounted for reciprocating movement toward and away from the stationary fixture. The housing is rotationally fixed. A spindle is carried by the housing for reciprocating movement therewith and for rotational movement within the housing. A shank is carried by the spindle and is configured for rotational and reciprocal movement with the spindle. The shank has a flute tap section, an elongated shank body, a transverse section opposite the flute tap and a bent section between the transverse section and the elongated body. The housing is moved toward and into contact with a first of the series of articles with the spindle rotating so that the flute tap section engages the article to form a thread therein. When the article is released from the fixture, in conjunction with the housing reciprocating away from the fixture, the article is urged along the shank, away from the flute tap section to and around the bent shank and ejected therefrom.

17 Claims, 1 Drawing Sheet

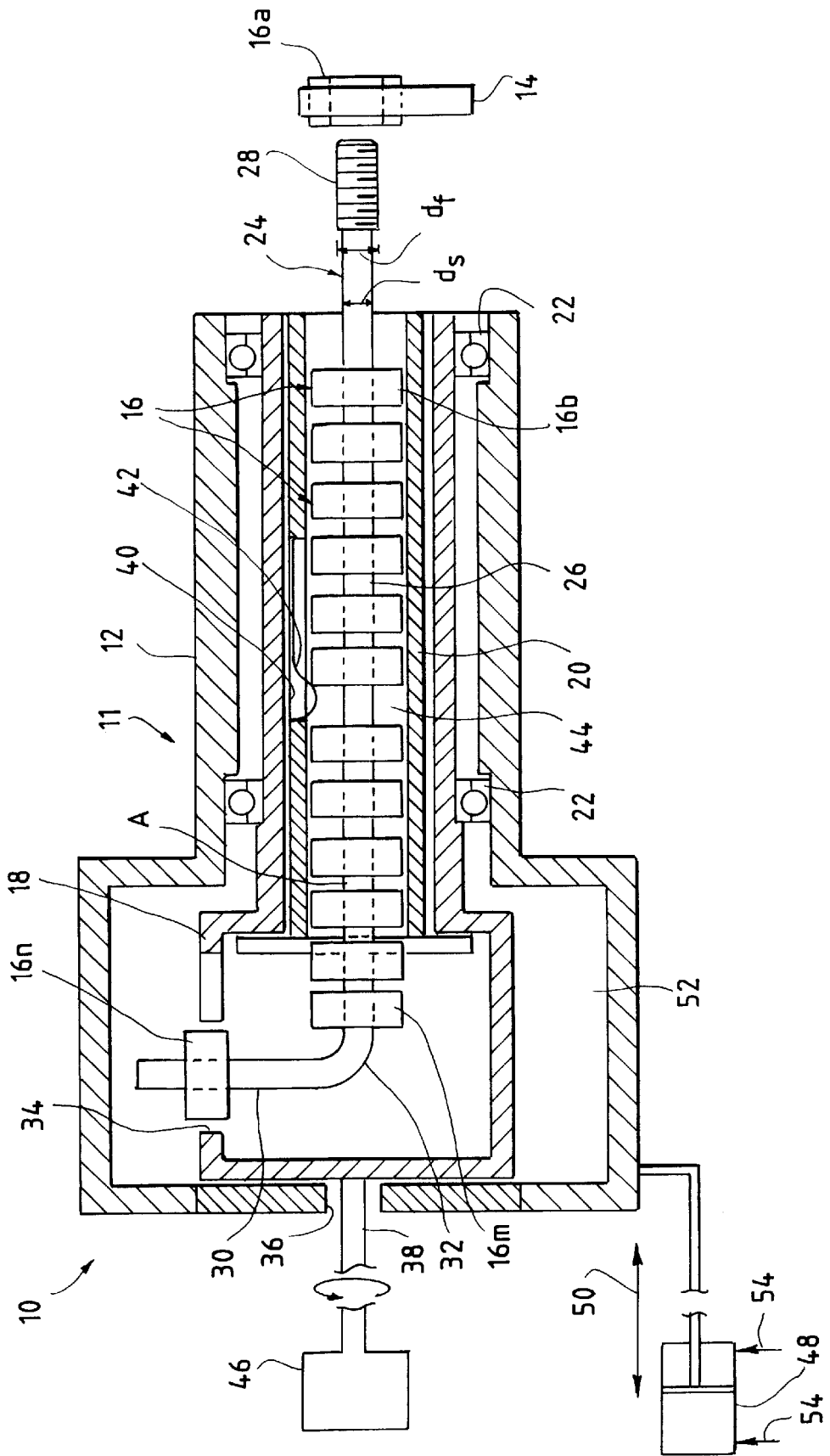

THREAD TAPPING MACHINE

This application claims the benefit of provisional application No. 60/231,585, filed Sep. 11, 2000.

BACKGROUND OF THE INVENTION

This invention pertains to an automated thread tapping machine. More particularly, this invention pertains to a bent shank thread tapping machine having a reciprocating tapping head.

Thread tapping machines are well-known in the art. These machines are used to, for example, tap or form female threads in articles, such as fasteners, for example, nuts. In one known thread tapping machine, a bent shank having a cutting tool (i.e., a tap flute) formed at the head thereof is positioned in a stationary tapping head. An article into which threads are to be tapped is moved into engagement with the tap flute at the end of the shank. The article is further urged into engagement with the cutting tool and threads are cut or tapped into the article. The article is then urged along the shank (at a portion of the shank having a reduced diameter) and is discharged from the shank after the bent portion thereof.

Another type of thread tapping machine includes a head portion having a tap flute mounted thereto. The head reciprocates so as to bring the cutting tool into contact with an article into which threads are tapped. The head then retracts after the threads have been cut.

Although both of these known machines are quite useful for their intended purposes, there are drawbacks. First, with respect to the bent shanktype machine, the articles into which the threads are tapped must be moved into contact with the rotating shank. In that the article may be quite small or conversely quite large, it can be difficult to support and maintain these articles relatively rigidly as they are moved into contact with the rotating shank. With respect to the reciprocating-type machine, the process of moving the head into contact with the article and then withdrawing the head is time consuming, and is quite labor intensive. In addition, the thread cuts can be compromised by "backing-out" the cutting tool after the threads have been cut.

Accordingly, there exists a need for an automated tapping machine that can tap threads into articles a relatively continuous basis. Desirably, such a machine can tap threads into a wide variety of articles of different sizes and can do so quickly and in a cost efficient and effective manner.

BRIEF SUMMARY OF THE INVENTION

A thread tapping machine taps female threads into a series of associated articles that are held in an associated stationary fixture or frame. The tapping machine includes a head having a housing that is mounted for reciprocating movement toward and away from the stationary fixture. The housing is rotationally fixed.

A spindle is carried by the housing for reciprocating movement along with the housing and for rotational movement within the housing. One or more bearings can be used to mount the spindle within the housing.

A shank is carried by the spindle for rotational and reciprocal movement with the spindle. The shank has a flute tap section having a largest diameter and an elongated shank body having diameter smaller than the flute tap section diameter. The shank further includes a transverse section opposite the flute tap and a bent section between the transverse section and the elongated body.

A first drive moves the housing in a reciprocating manner. In a current embodiment, the first drive is an air cylinder. A second drive moves the spindle in a rotational manner. In a current embodiment, the second drive is an electric drive, i.e., an electric motor.

The housing is moved toward and into contact with a first of the series of articles with the spindle rotating so that the flute tap section engages the first article to form a thread therein. When the first article is released from the fixture, in conjunction with the housing reciprocating away from the fixture, the article is urged along the shank, away from the flute tap section to and around the bent shank. The first article is eventually ejected from the shank at the transverse section.

In a preferred embodiment, a spindle tube is disposed coaxially within the spindle, with the shank disposed within the spindle tube. An opening can be formed in a side wall of the spindle, through which the shank transverse portion extends. In this manner, the shank rotates with rotation of the spindle.

The housing can include a receiving region for receiving the articles ejected from the shank transverse section. To provide interconnection of the second drive and the spindle, the housing can include a longitudinal opening and the machine can include a drive dog extending from the second drive to the spindle through the longitudinal opening.

Preferably, the spindle tube includes an interference member, such as a detent that is configured to permit the articles to pass forwardly along the shank from the flute tap to the bent section and is further configured to prevent the articles from passing rearwardly along the shank from the bent section to the flute tap.

The detent can be disposed in an opening formed in the spindle tube. In a present embodiment, the detent is formed from spring steel.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawing, wherein:

FIG. 1 is a partial cross-sectional view of a thread tapping machine embodying the principles of the present invention.

DETAILED DESCRIPTION OF THE INVENTION

While the present invention is susceptible of embodiment in various forms, there is shown in the drawing and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

Referring to FIG. 1, there is shown an improved thread tapping machine 10. The machine 10 includes a head 11 having a housing 12 that is mounted for reciprocating movement. The housing 12 reciprocates toward and away from a stationary fixture or frame 14 for supporting an article 16a into which threads are to be tapped, such as a nut, for example, a conventional hexnut.

A spindle 18 is carried by the housing 12 and a spindle tube 20 is carried by the spindle 18. The spindle 18 is mounted within the housing 12 for rotational movement. To this end, the spindle 18 rotates within the housing 12 (which remains stationary relative to rotational movement of the spindle 18) and reciprocates along with the housing 12 toward and away from the article 16. The spindle 18 is mounted within the housing 12 on bearings 22 or the like to permit the spindle 18 to freely rotate within the housing 12. In a current embodiment, the spindle 18 is mounted to the housing 12 for rotational movement by a set of roller bearings 22. The spindle tube 20 is mounted centrally or coaxially within the spindle 18, relative to an axis A.

A shank 24 is positioned coaxially within the spindle 18 and spindle tube 20. The shank 24 includes an elongated body 26, a tap flute 28, a transverse section 30, and an angle or bent section 32 extending between the elongated body 26 and the transverse section 30. The transverse section 30 of the shank 24 extends through an opening 34 in the spindle 18 so that the shank 24 is rotated along with the spindle 18. In addition, the transverse section 30 is configured for discharging the tapped articles 16 from the shank 24, as will be discussed below.

The housing 12 includes a longitudinal opening 36 configured for receiving a drive dog 38. The drive dog 38 extends through the opening 36 in the housing 12 into a key way (not shown) or the like in the spindle 18. In this manner, as the drive dog 38 rotates, it imparts rotational movement to the spindle 18 to rotate the spindle 18, spindle tube 20 and shank 24, while the housing 12 remains (rotationally) stationary. The opening 34 in the spindle 18 through which the transverse section 30 of the shank 24 extends is configured to allow the articles 16 that have been tapped to be discharged therethrough.

The spindle tube 20 includes an opening 40 into which an interference element 42, such as a detent is mounted. The detent 42 extends into the open central portion 44 of the spindle tube 20 for interferingly engaging the articles 16 moving along the shank 24. In a current embodiment, the detent 42 is formed from a spring steel material or the like so that it is readily urged out of the way of the articles 16 moving along the shank 24 and returns to position after the articles 16 have passed.

In a current embodiment, rotational movement is imparted to the spindle 18 through the drive dog 38 by an electric motor 46. Reciprocating movement of the housing 12 is provided by a cylinder 48, such as an air cylinder that is supplied with compressed air as indicated at 54. Those skilled in the art will recognize the various drive arrangements that can be used for imparting rotational movement to the spindle 18 as well as reciprocating movement to the machine housing 12. All such other drive arrangements are within the scope and spirit of the present invention.

In use, an article 16a (such as a conventional hexnut) is fixedly mounted in the fixture 14 or a like device in proximity to the tapping machine 10. The tapping machine 10 is then activated by rotating the spindle 18, which in turn rotates the spindle tube 20 and shank 24. The housing 12 is then moved toward the article 16a such that the tap flute portion 28 of the shank 24 contacts the article 16a. As the housing 12 continues moving forward into the article 16a, threads are cut into the article 16a by the tap flute 28. Once the entirety of the flute 28 traverses through the article 16a, the article 16a is released from the fixture 14. In this manner, the article 16a remains on the shank 24 between the flute 28 and the bent section 32. As will be recognized by those skilled in the art, the diameter $d_s$, of the shank 24 rearward of the flute 28 is smaller than the largest diameter $d_f$ at the flute 28. In this manner, the articles 16b–n freely traverse along the shank 24 after the flute portion 28 of the shank 24 has traversed fully therethrough.

Once the threads are fully cut into the article, the tapping machine housing 12 retracts (reciprocates away from the fixture 14, as indicated by the double headed arrow at 50) and a new article blank is mounted within the fixture 14. The reciprocating motion, cutting of the threads and movement of the now threaded or cut articles 16 along the shank 24 continues in an automated manner. As additional articles 16 are tapped, the articles 16b–n will tend to stack up along the elongated body portion 26 of the shank 24. As the articles 16b–n continue stacking along the shank 24, the first or earlier cut articles 16b–m will be urged toward the shank bent section 32. Once traversing around the bent section 32, the articles, such as 16n, move onto the transverse section 30 and are ejected from the shank 24 through opening 34. A receiving region 52 in the housing 12 accommodates the articles 16 that are ejected from the shank 24 until they are removed from the machine 10.

As set forth above, the detent 42 is positioned within the spindle tube 20 so that articles 16h–n pass from the forward section of the shank (that section closest to the flute tap as indicated at 54), over the detent 42 toward, the shank bent section 32. Once the articles 16h–n pass beyond the detent 42, the detent 42 prevents back-flow, that is prevents articles 16h–m moving backward along the shank 24 toward the flute tap 28. To this end, the articles 16b–n will be serially ejected from the shank 24 without backing up along the shank 24 to interfere with the tapping of subsequent articles, e.g., 16a.

In a current embodiment, the machine 10 is configured so that the spindle tube 20 can be readily removed and replaced. This provides a number of benefits. First, the spindle tube 20 can be configured to accommodate a specific size article. This assures that the articles will be properly secured and conveyed after thread tapping. In this manner, when it is desired to tap articles 16 of a different size, it is necessary only to remove and replace the spindle tube 20 to that size necessary for the desired article.

In addition, the spindle tube 20, rather than the spindle is subject to wear during use. Thus, the tube 20 can be configured and manufactured as a "consumable" part. In this manner, a variety of different sizes of spindle tubes 20 can be maintained in inventory to assure continued operation of the machine for any desired size article. As will be appreciated by those skilled in the art, the spindle tube 20 can be designed as a relatively low cost part of the machine 10, providing an overall cost savings in replacement of this lower cost, wear-designed part.

In a current embodiment, the machine 10 is configured to tap threads in nuts ranging in size from about ⅛ inch to about 1/2 inch. Presently, operating speeds for the machine 10 are about 200 to about 300 revolutions per minute (lower speeds for larger nuts). It is anticipated that other types of articles and more specifically other sizes of nuts, both smaller and larger, can be tapped using the present machine.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A thread tapping machine for tapping female threads into a series of associated articles that are held in an associated stationary fixture, comprising:

a housing mounted for reciprocating movement toward and away from the stationary fixture, the housing being rotationally fixed;

a spindle carried by the housing for reciprocating movement therewith, the spindle being configured for rotational movement within the housing;

a shank carried by the spindle and configured for rotational and reciprocal movement therewith, the shank having a flute tap section defining a largest diameter and an elongated shank body having diameter smaller than the largest diameter at the flute tap section, the shank further including a transverse section opposite the flute tap section and a bent section between the transverse section an the elongated body;

a first drive for moving the housing in a reciprocating manner; and a second drive for moving the spindle in a rotational manner, wherein the housing is moved toward and into contact with a first of the series of articles with the spindle rotating so that the flute tap section engages the first of the series of articles to form a thread therein, and wherein when the first of the series of articles is released from the stationary fixture, in conjunction with the housing reciprocating away from the fixture, the first of the series of articles is urged along the shank, away from the flute tap section to and around the bent shank, the first of the series of articles being ejected from the shank at the transverse section.

2. The thread tapping machine in accordance with claim 1 including a spindle tube disposed coaxially within the spindle, the shank being disposed within the spindle tube.

3. The thread tapping machine in accordance with claim 1 including an opening defined in the spindle, wherein the shank transverse portion extends, at least in part, through the opening defined in the spindle.

4. The thread tapping machine in accordance with claim 1 wherein the housing includes a receiving region for receiving the articles ejected from the shank transverse section.

5. The thread tapping machine in accordance with claim 1 wherein the housing includes a longitudinal opening therein, the machine including a drive dog extending from the second drive to the spindle through the longitudinal opening.

6. The thread tapping machine in accordance with claim 2 wherein the spindle tube includes a detent mounted therein, the detent configured to permit the articles passing forwardly along the shank from the flute tap to the bent section and further configured to prevent the articles passing rearwardly along the shank from the bent section to the flute tap.

7. The thread tapping machine in accordance with claim 6 wherein the detent is disposed in an opening formed in the spindle tube.

8. The thread tapping machine in accordance with claim 6 wherein the detent is formed from spring steel.

9. The thread tapping machine in accordance with claim 1 wherein the spindle is mounted within the housing by at least one bearing.

10. The thread tapping machine in accordance with claim 1 wherein the second drive is an electric drive.

11. The thread tapping machine in accordance with claim 1 wherein the first drive is an air cylinder.

12. A thread tapping machine for tapping female threads into a series of associated articles that are held in an associated stationary fixture, comprising:

a housing mounted for reciprocating movement toward and away from the stationary fixture, the housing being rotationally fixed;

a spindle carried by the housing for reciprocating movement therewith, the spindle being configured for rotational movement within the housing, the spindle including an opening formed in a side wall thereof;

at least one bearing for mounting the spindle within the housing;

a spindle tube carried coaxially within the spindle;

a shank carried by the spindle, disposed within the spindle tube, the shank configured for rotational and reciprocal movement therewith, the shank having a flute tap section defining a largest diameter and an elongated shank body having diameter smaller than the largest diameter at the flute tap section, the shank further including a transverse section opposite the flute tap section and a bent section between the transverse section an the elongated body, the transverse section extending, at least in part, through the side wall opening in the spindle;

an interference member;

a first drive for moving the housing in a reciprocating manner; and a second drive for moving the spindle in a rotational manner, wherein the housing is moved toward and into contact with a first of the series of articles with the spindle rotating so that the flute tap section engages the first of the series of articles to form a thread therein, and wherein when the first of the series of articles is released from the stationary fixture, in conjunction with the housing reciprocating away from the fixture, the first of the series of articles is urged along the shank, away from the flute tap section to and around the bent shank, the first of the series of articles being ejected from the shank at the transverse section, and wherein the interference member is configured to permit the articles passing forwardly along the shank from the flute tap to the bent section and further configured to prevent the articles passing rearwardly along the shank from the bent section to the flute tap.

13. The thread tapping machine in accordance with claim 12 wherein the housing includes a receiving region for receiving the articles ejected from the shank transverse section.

14. The thread tapping machine in accordance with claim 12 wherein the spindle tube includes an opening in a side wall thereof, and wherein the interference member is a detent disposed in the side wall opening.

15. The thread tapping machine in accordance with claim 14 wherein the detent is formed from spring steel.

16. The thread tapping machine in accordance with claim 12 wherein the first drive is an air cylinder.

17. The thread tapping machine in accordance with claim 12 wherein the second drive is an electric drive.

* * * * *